United States Patent [19]

Arnquist

[11] Patent Number: 4,878,705
[45] Date of Patent: Nov. 7, 1989

[54] ROBOT GRIPPER PASSIVELY LOCKED

[75] Inventor: David C. Arnquist, Riviera Beach, Fla.

[73] Assignee: Texas Instruments Incorporated, Dallas, Tex.

[21] Appl. No.: 169,690

[22] Filed: Mar. 18, 1988

[51] Int. Cl.⁴ .............................................. B25J 15/02
[52] U.S. Cl. .................................... 294/116; 294/907; 901/33; 901/36
[58] Field of Search ................ 294/116, 88, 86.4, 907, 294/103.1, 119.1, 67.33, 110.1, 115; 414/741, 751; 901/31, 32, 33, 34, 36, 37, 38, 39, 46; 269/32, 34, 229, 230, 233, 235

[56] References Cited

U.S. PATENT DOCUMENTS 3,012,811 12/1961 Sandrock ............................ 294/116
3,736,018 5/1973 Sayre, Jr. et al. .................... 294/88

Primary Examiner—Robert B. Reeves
Assistant Examiner—Dean J. Kramer
Attorney, Agent, or Firm—Gary C. Honeycutt; Melvin Sharp; Rhys Merrett

[57] ABSTRACT

The disclosure relates to a gripper arm for use in conjunction with a robotic arm for gripping a tool wherein the tool is retained in the gripper arm until a positive action signal and lack of pressure from the tool are simultaneously provided. The tool cannot be discharged from the gripper arm under other conditions including power loss to the robotic device.

7 Claims, 3 Drawing Sheets

ROBOT GRIPPER PASSIVELY LOCKED

BACKGROUND OF THE INVENTION

1. FIELD OF THE INVENTION

This invention relates to a gripper arm for use by a robotic device and, more specifically, to such a gripper arm having a fail-safe mechanism to prevent release of a grasped object due to loss of power or the like to the gripper arm.

2. BRIEF DESCRIPTION OF THE PRIOR ART

Prior art grippers for use in connection with robotic devices are generally operated electromechanically. In such devices, when there is a loss of power, the gripper arms tend to separate and permit the grasped object to be released therefrom, thereby often causing damage to the released object as well as any object with which the released object may come in contact. It is therefore apparent that gripper arms of the type above described would operate more safely and economically if this problem could be eliminated or at least minimized.

SUMMARY OF THE INVENTION

In accordance with the present invention, the above noted problem of the prior art is minimized and there is provided a gripper arm for a robotic device which will retain an object within its jaws in the event of a loss of power.

Briefly, the above is accomplished by providing a robot end-effector or gripper having a double latch mechanism to securely hold heavy objects, such as machine tool drills, mills and other implements, even while the gripper is in motion. The gripper is attached to the final joint of an articulated robot arm. To grasp an object, the gripper, with the jaws in the open position, is pushed against the object to be gripped. A sensor in the plunger of the gripper detects the presence of an object therein. As the robot arm pushes the gripper against the object therein, the plunger depress, this causing a closing of the jaws of the gripper. The plunger rollers act as rolling cams against the pivoted ends of the jaws, holding the jaws against the object as long as the plunger is depressed.

The gripper jaws have semicircular openings. When the jaws are closed, they almost completely surround the object. A second sensor, which is positioned in one of the jaws, detects the presence of an object within the jaws. This signals the robotic device that the jaws are holding an object.

Once the jaws are completely closed, a latch pin travels through a shaft attached to the plunger and holds the jaws shut. There is sufficient force on this latch pin to maintain the jaws closed, even when the grasped object or the gripper or both move.

Two conditions must exist before the jaws can be released, these being that, first, the plunger must be depressed from its normal "jaws closed" position and, then, an electromagnet attached to the latch pin releases the pin. The electromagnet is designed so that its force alone is not sufficient to release the pin. This provides an anti-drop safety feature. The gripper cannot release the object solely on the action of the electromagnet.

DESCRIPTION OF THE PREFERRED EMBODIMENT

Figure 1:
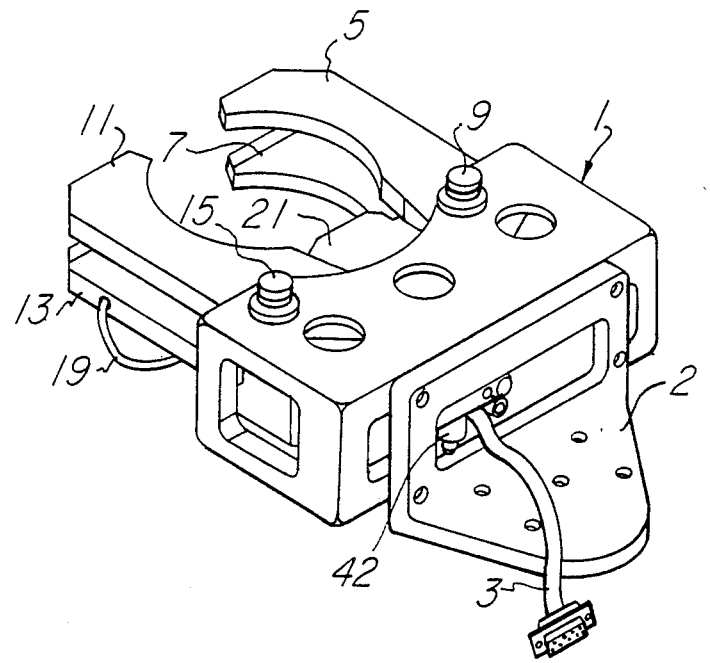
FIG. 1 is a top perspective view of the robot gripper in accordance with the present invention.
Figure 2:
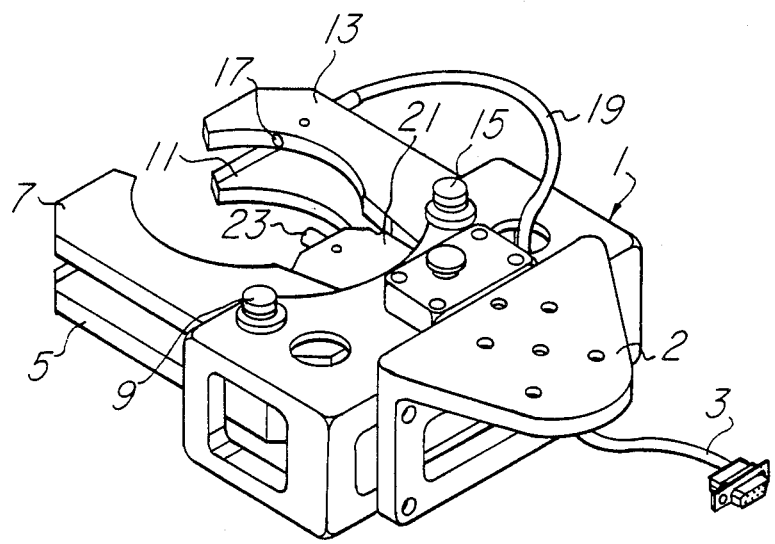
FIG. 2 is a bottom perspective view of the robot gripper in accordance with the present invention.

Referring now to the drawings, there is shown a gripper assembly in accordance with a preferred embodiment of the present invention. The assembly includes a housing 1 to which is secured an angle mount gripper 2 for connection of the gripper assembly to a robotic arm (not shown) of well known construction. A multiwire conductor 3 provides power for powering of the solenoid 4 and the sensor electronics. The sensors are used for computer feedback. A solenoid pin 35 (FIG. 3) extends through the solenoid and is secured to a pin lock gripper 37 which is disposed above a groove 39 in shoulder 41. The shoulder 41 is secured to the plunger 21 and travels laterally therewith.

The assembly includes first jaw grippers 5 and 11 which are rotatable about pivots 9 and 15 and second jaw grippers 7 and 13 which are rotatable about pivots 9 and 15. The jaw gripper 13 includes a sensor 17 which is coupled to the electronics via a cable 19 for determining that a tool is disposed between the gripper arms. A plunger 21 is positioned between the left jaw and right jaw grippers, the plunger including a locating button 23 thereon for sensing that a tool is positioned against the plunger.

Figure 3:
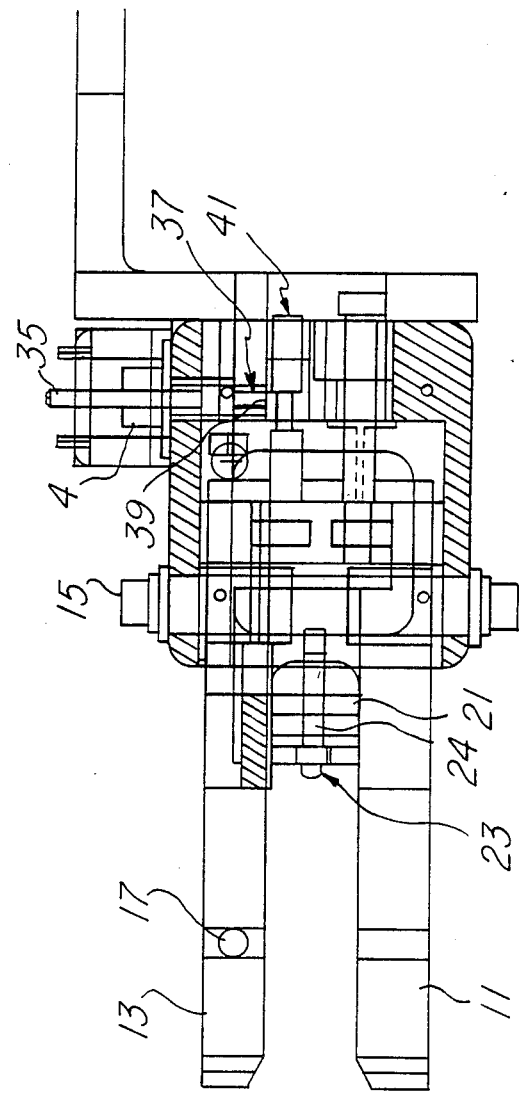
FIG. 3 is a vertical cross-sectional view of the robot gripper of FIGS. 1 and 2.
Figure 4:
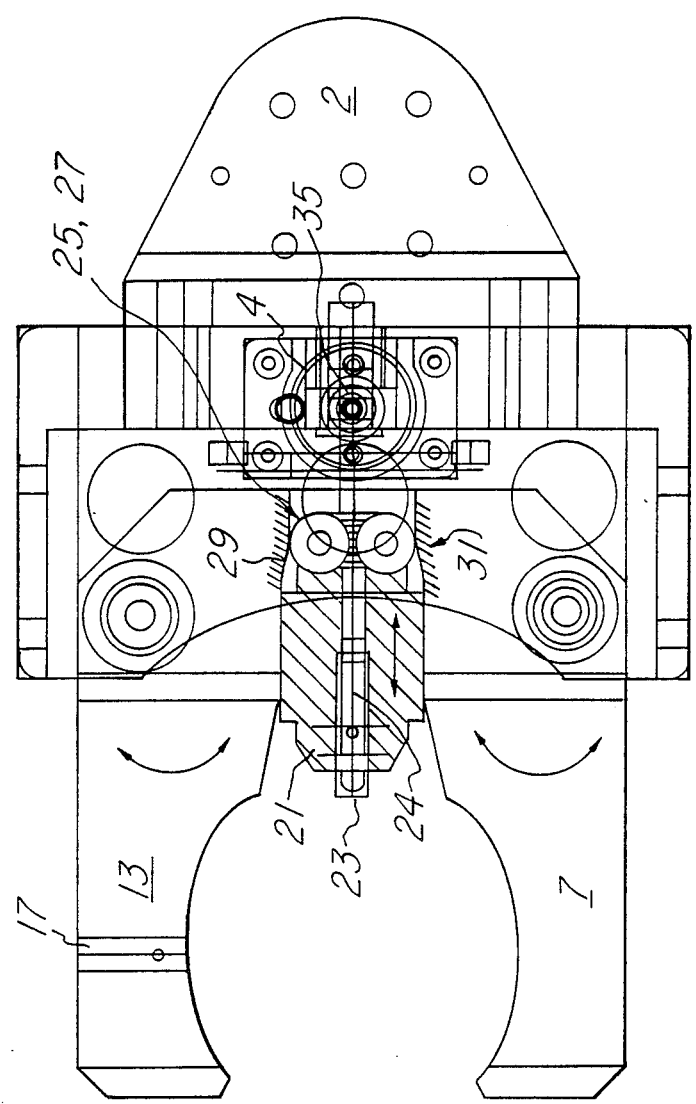
FIG. 4, is a horizontal cross-sectional view of the robot gripper of FIGS. 1 and 2.

The plunger 21 is movable along a shaft 24 disposed between the jaw grippers. When the locating button 23 is contacted, indicating that a tool is positioned between the jaw grippers 5, 7, 11 and 13, the jaw grippers come together, forcing the tool against the plunger 21 and driving the plunger away from the open end of the jaw grippers and against the rollers 25 and 27. This plunger movement causes the rollers 25 and 27 to move against cam surfaces 29 and 31 which causes these rollers to come together and force the jaws to further rotate and to close. In this position, the shoulder 41 is moved to the right as shown in FIGS. 3 and 4 and permits the pin lock gripper 37 which is attached to the solenoid or latch pin 35 to move into the groove 39 and lock the jaws in the closed position in this manner.

The jaws will not unlock until the solenoid 4 is energized via an external signal along the conductor 3. Energization of the solenoid 4 causes the latch pin 35 to move upwardly, thereby causing the pin lock gripper 37 to move out of the groove 39 and permit the jaws to open.

As an example of normal operation, with the jaws initially open, the gripper assembly is initially pushed against the tool to be handled by the robotic device with the tool and collar around the tool between the jaws. The sensor 23 detects the presence of a tool at the plunger 21 due to the inward movement of the robot arm and causes the jaw gripper arms to come together, thereby forcing the tool into compression against the plunger and causing the plunger to move to the right. This plunger movement causes the rollers to move against the cam surfaces 29 and 31 which causes the gripper jaws to come together and also causes the rollers to prevent the gripper jaw arms from moving apart. As the plunger moves to the right, the shaft 41 is also moved to the right until the groove 39 therein is disposed below the pin lock gripper 37, which is attached to the solenoid latch pin 35, and prevents further movement of the plunger which prevents the jaws from opening. In this position, the jaws will be locked against a tool therein and retain the tool in that status in the event of a power loss. The sensor 42 detects that the gripper is locked.

The robot arm (not shown) now moves the gripper assembly and the tool therein to the desired position and the gripper assembly places the tool into the unloading fixture or other depository in standard manner. In this condition, the pressure on the plunger 21 due to the robot arm is released, the plunger thereby releasing the pressure on the pin lock gripper 37. The electromagnet or solenoid 4 is then energized via the cable 3 to cause the solenoid pin 35, now in the released condition, to move upwardly and carry the pin lock gripper 37 therewith. This releases the plunger 21 for movement to the left as shown in FIGS. 3 and 4, permitting the jaws to open with release of the tool therein. The gripper assembly then moves away from the tool under control of the robot arm to which it is attached, the open jaws releasing the tool.

It can be seen that there has been provided a gripper assembly for a tool or the like which retains the tool in the gripper until a positive action signal and pressure on the tool are simultaneously provided. The tool cannot be discharged from the gripper assembly under other conditions including power loss.

Though the invention has been described with respect to a specific preferred embodiment thereof, many variations and modifications will immediately become apparent to those skilled in the art. It is therefore the intention that the appended claims be interpreted as broadly as possible in view of the prior art to include all such variations and modifications.

I claim:

1. A robot gripper comprising:
   (a) a set of gripping jaws;
   (b) means including a plunger and sensor responsive to predetermined positioning of an object within said jaws to lockingly close said jaws on said object and provide a predetermined sensed pressure condition within said jaws; and
   (c) means including a powered latch pin responsive to removal of said predetermined sensed pressure condition and a predetermined further condition to unlock and open said gripping jaws.

2. A robot gripper as set forth in claim 1 wherein said means responsive to predetermined positioning includes means movable from a first position to a second position to close said jaws and lock said jaws.

3. A robot gripper as set forth in claim 2 wherein said means responsive to predetermined positioning further includes an electromagnetic device and a pin controlled by said electromagnetic device, said pin being responsive to said means movable moving from said first position to said second position to lock said means movable in said second position, and wherein said predetermined further condition includes means energizing said electromagnetic device to move said pin to unlock said means movable.

4. A robot gripper as set forth in claim 2 wherein said means movable from a first position to a second position comprises a plunger extending into the region within said jaws, a shoulder travelling with said plunger and a groove in said shoulder.

5. A robot gripper as set forth in claim 3 wherein said means movable from a first position to a second position comprises a plunger extending into the region within said jaws, a shoulder travelling with said plunger and a groove in said shoulder.

6. A robot gripper as set forth in claim 5 wherein said pin enters said groove responsive to said means movable moving from said first position to said second position to lock said jaws, said means movable applying a force against said pin.

7. A robot gripper comprising:
   (a) a set of gripping jaws;
   (b) a plunger located between said jaws, said plunger including means for causing said jaws to close whenever the plunger is depressed by an object to be gripped;
   (c) a solenoid-driven latch pin positioned to lock said jaws in place when the plunger is fully despressed; and
   (d) means for energizing said solenoid and thereby removing said latch pin responsive to reduced pressure on said plunger, whereby the jaws are released to permit removal of the gripped object.

* * * * *